United States Patent
Bradley, II

(10) Patent No.: US 9,081,982 B2
(45) Date of Patent: Jul. 14, 2015

(54) AUTHORIZED DATA ACCESS BASED ON THE RIGHTS OF A USER AND A LOCATION

(75) Inventor: Charles B. Bradley, II, Largo, FL (US)

(73) Assignee: Raytheon Company, Waltham, MA (US)

(*) Notice: Subject to any disclaimer, the term of this patent is extended or adjusted under 35 U.S.C. 154(b) by 32 days.

(21) Appl. No.: 13/088,799

(22) Filed: Apr. 18, 2011

(65) Prior Publication Data

US 2012/0266239 A1    Oct. 18, 2012

(51) Int. Cl.
*G06F 7/04* (2006.01)
*G06F 21/62* (2013.01)

(52) U.S. Cl.
CPC .... *G06F 21/6218* (2013.01); *G06F 2221/2111* (2013.01); *G06F 2221/2113* (2013.01)

(58) Field of Classification Search
USPC ............................................................ 726/4
See application file for complete search history.

(56) References Cited

U.S. PATENT DOCUMENTS

| | | | |
|---|---|---|---|
| 5,276,901 A | 1/1994 | Howell et al. | |
| 5,828,832 A | 10/1998 | Holden et al. | |
| 5,940,591 A | 8/1999 | Boyle et al. | |
| 5,996,077 A | 11/1999 | Williams | |
| 6,041,357 A * | 3/2000 | Kunzelman et al. | 709/228 |
| 6,161,110 A | 12/2000 | Curtis et al. | |
| 6,324,645 B1 | 11/2001 | Andrews et al. | |
| 6,412,070 B1 | 6/2002 | Van Dyke et al. | |
| 6,785,728 B1 | 8/2004 | Schneider et al. | |
| 6,920,558 B2 | 7/2005 | Sames et al. | |
| 7,134,022 B2 | 11/2006 | Flyntz | |
| 7,216,173 B2 | 5/2007 | Clayton et al. | |
| 7,421,541 B2 * | 9/2008 | Long et al. | 711/141 |
| 7,506,366 B1 * | 3/2009 | Sze et al. | 726/5 |
| 7,729,995 B1 * | 6/2010 | Alain et al. | 705/71 |
| 2002/0010768 A1 | 1/2002 | Marks et al. | |
| 2002/0053020 A1 | 5/2002 | Teijido et al. | |
| 2003/0154401 A1 | 8/2003 | Hartman et al. | |
| 2005/0114672 A1 * | 5/2005 | Duncan et al. | 713/182 |
| 2006/0112096 A1 * | 5/2006 | Ahluwalia et al. | 707/6 |

(Continued)

FOREIGN PATENT DOCUMENTS

| | | |
|---|---|---|
| WO | WO 96/00942 | 1/1996 |
| WO | WO 02/03180 | 1/2002 |
| WO | WO 02/13444 | 2/2002 |

OTHER PUBLICATIONS

Hansen et al., Location-Based Security Framework for use of Handheld Devices in Medical Information Systems, 2006, Retrieved from the Internet <URL: ieeexplore.ieee.org/stamp/stamp.jsp?tp=&arnumber=1599047&userType=inst>, pp. 1-5 as printed.*

(Continued)

*Primary Examiner* — Michael Chao
(74) *Attorney, Agent, or Firm* — Daly, Crowley, Mofford & Durkee, LLP

(57) ABSTRACT

Access to files is properly granted regardless of whether an accessing user is located at their primary location or at any "roaming" location. In particular, the techniques herein consider the user rights, rights of any computer from which the user is accessing files, and the rights associated with the files themselves, such as by determining the User ∩ Computer intersection of access rights (an overlap between rights of the user and rights of the computer), and applying these access rights to file rights (e.g., file metadata) to determine what access the user has to the files (e.g., viewing, modifying, etc.).

19 Claims, 11 Drawing Sheets

(56) References Cited

U.S. PATENT DOCUMENTS

| | | |
|---|---|---|
| 2009/0235334 A1 | 9/2009 | Park |
| 2010/0332825 A1* | 12/2010 | Bradley et al. ............... 713/158 |
| 2011/0030045 A1 | 2/2011 | Beauregard et al. |
| 2012/0173257 A1* | 7/2012 | Preiss et al. ..................... 705/2 |

OTHER PUBLICATIONS

Desai et al., Extending SELinux to meet LSPP data import/export requirements, 2006, Retrieved from the Internet <URL: selinuxsymposium.org/2006/agenda.php>, pp. 1-7 as printed.*

Chadwick et al., The PERMIS x.509 Role Based Privilege Management Infrastructure, 2002, Retrieved from the Internet <URL: dl.acm.org/citation.cfm?id=507732>, pp. 1-6 as printed.*

Kuhn et al.; Adding Attributes to Role-Based Access Control; Jun. 2010; Retrieved from the Internet <URL: csrc.nist.gov/groups/SNS/rbac/documents/kuhn-coyne-weil-10.pdf>; pp. 1-4 as printed.*

Sameshima et al., "Authorization with Security Attributes and Privilege Delegation Access Control Beyond the ACL"; Nov. 23, 1995, pp. 376-384.

Siuda, "Security Services in Telecommunications Networks", Mar. 8, 1998, pp. 45-52, Switzerland.

Gangemi, "Computer Security Basics", 1991, pp. 72-77.

Yesberg et al., QuARC: Expressive Security Mechanisms, Aug. 22, 1995, pp. 34-40, Salisbury, South Australia, 7 pages.

Gasser et al., "An Architecture for Practical Delegation in a Distributed System", 1990, pp. 20-30, Boxborough, MA., 11 pages.

Branstad et al., "The Role of Trust in Protected Mail", Trusted Information Systems, Inc., Glenwood, MD., pp. 210-215.

GB Combined Search and Examination Report under Sections 17 & 18(3); dated Jul. 25, 2012; for GB Pat. App. No. 1206566.0; 5 pages.

Great Britain Response filed on Oct. 16, 2012; for GB Pat. App. No. 1206566.0; 9 pages.

Patent Exam Report No. 1 dated Feb. 12, 2013 for Australian Patent No. 2012201489, filed Mar. 13, 2012, 3 pages.

Australian Patent Application No. 2012201489 Response to Office Action filed on Apr. 9, 2014, 23 pages.

Response to Office Action in Australian Patent Application No. 2012201489 filed on Feb. 5, 2014, 22 pages.

Australian Patent Application No. 2012201489 6th Examiner Report dated Aug. 14, 2014, 5 pages.

Examination Response as filed in Australian Patent Application No. 2012201489 on Jun. 19, 2013, 28 pages.

Patent Examination Report No. 2, in Australian Patent Application No. 2012201489 dated Jul. 17, 2013, 4 pages.

Examination Report dated Jun. 24, 2013 in Application No. GB1206566.0, 3 pages.

Responses to Examination Report of Jun. 24, 2013, filed on Aug. 21, 2013 in UK Patent Application No. GB1206566.0, 23 pages.

Examination Response Amendment dated Nov. 12, 2013, Australian Application No. 2012201489, 27 pages.

Great Britain Application No. GB1206566.0 Examination Report dated Jan. 7, 2014, 3 pages.

UK Patent Application No. GB1206566.0 Response to Office Action filed on Oct. 24, 2014, 5 pages.

Australian Patent Application No. 2012201489 Response to Office Action filed on Oct. 14, 2014, 13 pages.

Canadian Patent Application No. 2,771,485 Response to Examiner's Report filed on Apr. 22, 2014, 14 pages.

Australian Patent Application No. 2012201489 Office Action dated May 1, 2014, 6 pages.

Canadian Application No. 2,771,485 Examiner's Report dated Jul. 25, 2014, 6 pages.

Australian Patent Application No. 2012201489 Response filed on Aug. 4, 2014 24 pages.

Canadian Patent Application No. 2,771,485, Office Action dated Jul. 25, 2014, 6 pages.

Australian Patent Application No. 2012201489, Examination Report dated Feb. 19, 2014, 5 pages.

Examiner's Report dated Oct. 21, 2013, Application No. 2,771,485, 4 pages.

Australian Patent No. 2012201489 Notice of Acceptance dated Nov. 12, 2014, 2 pages.

Australian Patent No. 2012201489 Certificate of Grant dated Mar. 19, 2015, 1 page.

Canadian Patent Application No. 2,771,485 Response filed on Dec. 30, 2014 28 pages.

Application No. GB1206566.0 fr Examiner's Report dated Nov. 7, 2014 3 pages.

Great Britain A Notification of Grant dated Feb. 24, 2015; For Great Britain Pat. App. No. GB2490217; 2 pages.

Australian Patent Application No. 2012201489 Response filed on Nov. 12, 2014 for 25 pages.

Applicaton No. G81206568.0 Office Action dated Nov. 7, 2014 4 pages.

\* cited by examiner

AUTHORIZED DATA ACCESS BASED ON THE RIGHTS OF A USER AND A LOCATION

BACKGROUND

Access to files, such as documents, spreadsheets, or other data, is often restricted to authorized personnel. For instance, software documents often require passwords to open and/or modify the document, such that if someone does not have the proper password, access to the document is restricted. This arrangement, however, may not be the most optimal arrangement, particularly where levels of security are used, since passwords must be distributed to anyone who could have access, and passwords may become compromised and utilized by unauthorized users. The problem is exacerbated by the fact that certain users may have levels of access authority, while the computers from which they attempt to access the files have a different level of access authority.

SUMMARY

According to one or more embodiments of the invention, since user rights requirements may be different when not working from a primary location (e.g., their office computer), techniques herein properly grant access to files regardless of whether an accessing user is located at their primary location (e.g., office), a home office LAN (local area network), or at any other "roaming" LAN other than their primary location. In particular, the techniques herein consider the user rights, rights of any computer from which the user is accessing files, and the rights associated with the files themselves. For example, by determining the User ∩ Computer intersection of access rights (an overlap between rights of the user and rights of the computer), any application can compare the access rights to file rights (e.g., file metadata) to determine what access the user has to the files (e.g., viewing, modifying, etc.).

According to one or more embodiments described herein, a method comprises: receiving a session login request by a user from a computer; determining user access rights of the user; determining computer access rights of the computer; determining session access rights as an intersection of the user access rights and computer access rights; and authorizing access for the session to one or more files in a repository based on applying the session access rights to file permissions of the one or more files. In one embodiment, the file permissions are stored in metadata of the corresponding files.

In one embodiment of the method, there is a plurality of file permission requirements within the file permissions, and applying the session access rights to file permissions comprises confirming that the session access rights contain each of the plurality of file permission requirements. In another embodiment, applying the session access rights to file permissions comprises confirming that the session access rights contain one or more of the plurality of file permission requirements. In still another embodiment, applying the session access rights to file permissions comprises confirming that the session access rights contain at least one particular requirement of the plurality of file permission requirements and one or more other requirements of the plurality of file permission requirements.

In one embodiment of the method, determining computer access rights of the computer comprises: identifying the computer based on a unique address of the computer used for the session login request; and performing a lookup operation into a database to determine the computer access rights of the computer based on the unique address.

In one embodiment, the method further comprises: converting the session access rights into access claims; and relaying the access claims to the computer, wherein the access claims are used by the computer to request authorized access for the session to the one or more files in the repository.

In one embodiment of the method, authorizing access for the session to the one or more files in the repository comprises: granting rights to the session selected from the group consisting of: allowing viewing only authorized files; allowing opening only authorized files; and allowing modifying only authorized files.

In one embodiment of the method, user access rights, computer access rights, and session access rights comprise security classification. In another embodiment, user access rights, computer access rights, and session access rights comprise security caveats.

In one embodiment of the method, files are selected from a group consisting of: documents; emails; web pages; instant messaging (IM); and voice over Internet Protocol (VoIP) sessions.

According to one or more additionally specific embodiments herein, a tangible, non-transitory computer-readable medium has software encoded thereon, where the software when executed by a processor is operable to: receive a session login request by a user from a computer; determine user access rights of the user; determine computer access rights of the computer; determine session access rights as an intersection of the user access rights and computer access rights; and authorize access for the session to one or more files in a repository based on applying the session access rights to file permissions of the one or more files. In one embodiment, the file permissions are stored in metadata of the corresponding files.

In one embodiment of the computer-readable medium, there is a plurality of file permission requirements within the file permissions, and applying the session access rights to file permissions comprises confirming that the session access rights contain each of the plurality of file permission requirements. In another embodiment, applying the session access rights to file permissions comprises confirming that the session access rights contain one or more of the plurality of file permission requirements. In still another embodiment, applying the session access rights to file permissions comprises confirming that the session access rights contain at least one particular requirement of the plurality of file permission requirements and one or more other requirements of the plurality of file permission requirements.

In one embodiment of the computer-readable medium, determining computer access rights of the computer comprises: identifying the computer based on a unique address and/or PKI-based machine signature of the computer used for the session login request; and performing a lookup operation into a database to determine the computer access rights of the computer based on the unique address. In one embodiment, a user PKI signature can also be used determine user access rights. In another embodiment, user biometric information can be used to determine user access rights.

In one embodiment of the computer-readable medium, the software when executed is further operable to: convert the session access rights into access claims; and relay the access claims to the computer, wherein the access claims are used by the computer to request authorized access for the session to the one or more files in the repository.

In one embodiment of the computer-readable medium, authorizing access for the session to the one or more files in the repository comprises: granting rights to the session selected from the group consisting of: allowing viewing only authorized files; allowing opening only authorized files; and allowing modifying only authorized files.

In one embodiment of the computer-readable medium, user access rights, computer access rights, and session access rights comprise security classification. In another embodiment, user access rights, computer access rights, and session access rights comprise security caveats.

In one embodiment of the computer-readable medium, files are selected from a group consisting of: documents; emails; web pages; and voice over Internet Protocol (VoIP) sessions.

According to one or more additionally specific embodiments herein, an apparatus, comprises: one or more network interfaces; a processor coupled to the network interfaces and adapted to execute one or more processes; and a memory configured to store a process executable by the processor, the process when executed operable to: receive a session login request by a user from a computer; determine user access rights of the user; determine computer access rights of the computer; determine session access rights as an intersection of the user access rights and computer access rights; and authorize access for the session to one or more files in a repository based on applying the session access rights to file permissions of the one or more files. In one embodiment, the file permissions are stored in metadata of the corresponding files.

According to one or more additionally specific embodiments herein, a system, comprises: a computer configured to initiate a session login request by a user; and a server configured to: receive the session login request by a user from the computer; determine user access rights of the user; determine computer access rights of the computer; determine session access rights as an intersection of the user access rights and computer access rights; and authorize access for the session to one or more files in a repository based on applying the session access rights to file permissions of the one or more files. In one embodiment, the file permissions are stored in metadata of the corresponding files.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

A computer network is a geographically distributed collection of devices interconnected by communication links and segments for transporting data between the devices, such as personal computers and workstations, or other devices (e.g., portable "smart" devices, etc.). Many types of networks are available, with the types ranging from local area networks (LANs) to wide area networks (WANs).

Figure 1:
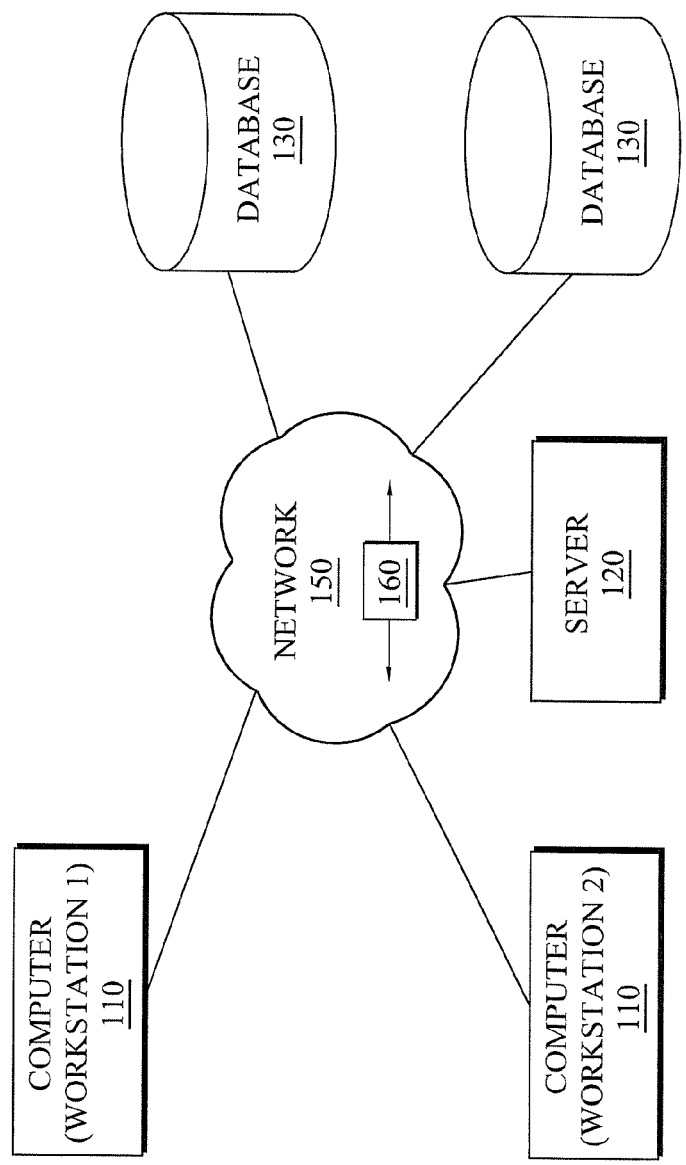
FIG. 1 illustrates an example computer network.

FIG. 1 is a schematic block diagram of an example computer network 100 illustratively comprising devices interconnected by various methods of communication through network 150, e.g., wired links or a wireless communication medium. As a simplified example, two workstations 110 (workstation "1" and "2"), such as computers, laptops, smart devices, etc., may be interconnected through the network 150 to one or more servers 120 and one or more databases or repositories 130. Data packets 160 may be exchanged among the devices of the computer network 100 using predefined network communication protocols such as the Transmission Control Protocol/Internet Protocol (TCP/IP) or other known protocols. Those skilled in the art will understand that any number of devices, links, etc. may be used in the computer network, and that the view shown herein is for simplicity.

Figure 2:
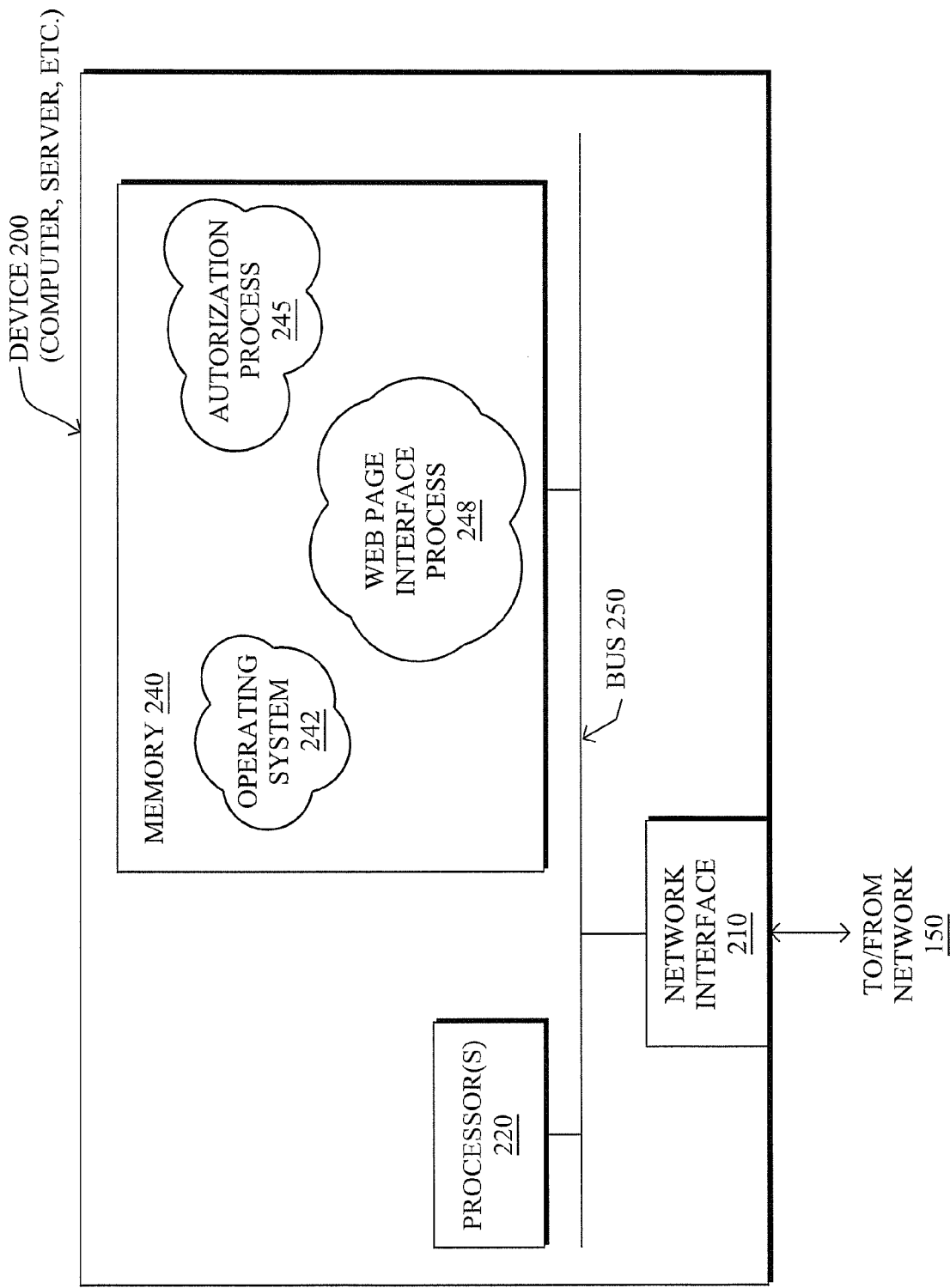
FIG. 2 illustrates an example server.

FIG. 2 is a schematic block diagram of an example device 200 that may be used with one or more embodiments described herein, e.g., as a computer 110, server 120, and/or database front-end 130 (that is, device 200 as shown is generally a computing device with various specific functionality present or absent based upon the particular embodiment of the device). The device may comprise a network interface 210, a processor 220, and a memory 240 interconnected by a system bus 250. The network interface 210 contains the mechanical, electrical, and signaling circuitry for communicating data over links coupled to the network 150. The memory 240 comprises a plurality of storage locations that are addressable by the processor 220 for storing software programs and data structures associated with the embodiments described herein. The processors 220 may comprise necessary elements or logic adapted to execute the software programs and manipulate the data structures.

An operating system 242, portions of which are typically resident in memory 240 and executed by the processor(s), functionally organizes the device by, inter alia, invoking operations in support of software processes and/or services executing on the device. These software processes and/or services may comprise authorization process 245 described below, and web page interface process 248 (e.g., client side and/or server side, as will be understood by those skilled in the art). As noted above, these functionalities may be present or absent on each particular device, and may also operate differently when located on different devices, as explained below. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

In certain types of secure scenarios, such as corporate work, government work, and/or military work, different levels of security or "clearances" are granted to users, where a user can access documents only at or below their level of security. Further, certain users may also be given access rights to particular compartments of security or "caveats" to which they may be granted access. For example, a user may be given "Top Secret" clearance, and caveats relating to a particular project or projects; or any items related to the project(s) (e.g., the "BLUE" project). Conventional management of authorized access in these scenarios has generally consisted of user-based access rights (e.g., the user as an individual or the user within a group of users), where a user is authorized to access a particular set of files regardless of the user's location. As one example, a public key infrastructure or "PKI" certificate may be granted to a user, which allows the user, often at a specific location, to access certain files, as will be understood by those skilled in the art. Alternatively, another known technique used to limit computerized access to software files has been to configure a particular user's computer for the same level of clearance as the user (e.g., in a database based on the location or identification of the user's computer). In this manner, a user is cleared for "Top Secret" and "BLUE" from the cleared computer, typically under the premise that access to the computer is allowed only to the particular user with "Top Secret" and "BLUE" access.

One problem associated with either of the techniques above is that they do not consider the user's location when granting access. For instance, it is often the case that computers themselves are granted access rights based on a number of factors. As an example, computers within a secure facility may be given a higher level of security clearance than a computer located in a user's home. Alternatively, a user with a particular level of security clearance may log in to a computer at a collaborative partner's location, but that user should not be given access to the collaborative partner's files. These known systems for authorized access management do not have provisions for allowing users to move among locations, particularly to locations that may have different access capabilities (e.g., different caveats or clearances).

According to one or more embodiments of the disclosure, a location-based system provides authorized access to files (data objects) based on who the user is, where the user is coming from, and what files are being accessed. Access to files is properly granted using the techniques described below regardless of whether an accessing user is located at their primary location or at any "roaming" location. In particular, the techniques herein consider the user rights, rights of any computer from which the user is accessing files, and the rights associated with the files themselves, such as by determining the User ∩ Computer intersection of access rights (an overlap between rights of the user and rights of the computer), and applying these access rights to file rights (e.g., file metadata) to determine what access the user has to the files (e.g., viewing, modifying, etc.).

Illustratively, the techniques described herein may be performed by software and/or firmware, such as in accordance with authorization process 245, which may contain computer executable instructions executed by the processor 220 to perform functions relating to the novel techniques described herein, e.g., in conjunction with web page interface process 248 and various file management processes and/or database management processes. For example, the techniques herein may be treated as extensions to conventional authorization protocols, such as secure token services (STS) processes, authorization processes, etc., and as such, would be processed by similar components understood in the art that execute such protocols, accordingly. Note that while authorization process 245 is shown as a single process on device 200, it is expressly contemplated that process 245 may be divided into a plurality of sub-processes, or may itself be a sub-process (sub-routine) of another encompassing process, such as a file or database management process.

Figure 3:
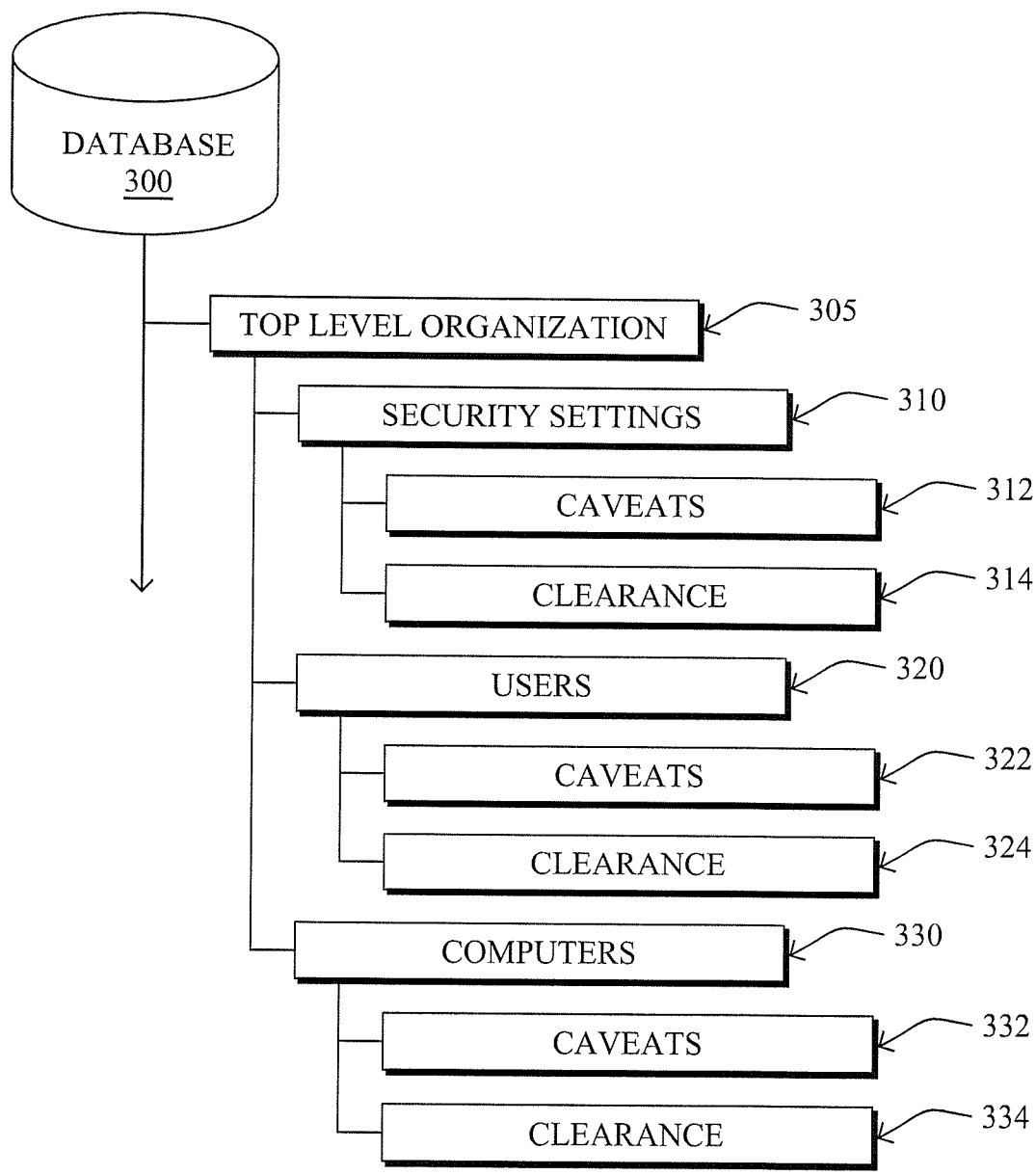
FIG. 3 illustrates an example database schema.
Figure 3A:
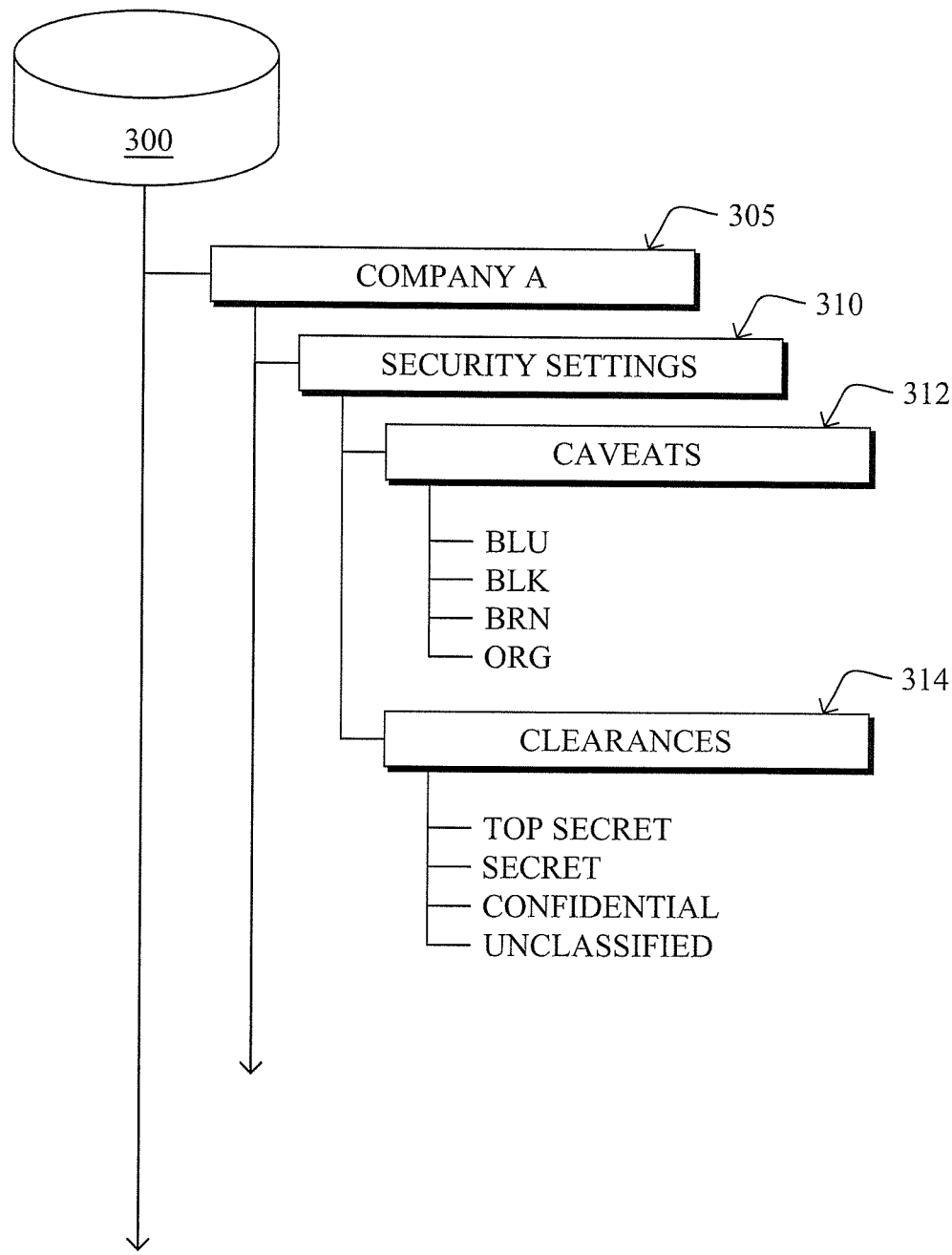
FIG. 3A-C illustrates example objects within the database schema of FIG. 3.

FIG. 3 illustrates an example database schema of a database 300 (e.g., a database 130 of FIG. 1). In particular, database 300, such as an active directory, may be shared among a plurality of organizations, in which case a top level organization category 305 may be used to separate the information between various organizations (e.g., companies, divisions, etc.) that have different attributes and/or classes, as well as different users and computers, as described below. For example, "Company A" and "Company B" may both share the database 300 at a virtual level, and top level organization 305 may be used to maintain the information separately. Within a particular organization, security settings 310 may be used to describe the available types of access rights, such as various security caveats 312 and/or security classifications or clearances 314. For example, with reference to FIG. 3A, security settings objects may populate the database with illustrative caveats 312 such as "BLU" (blue), "BLK" (black), "BRN" (brown), and "ORG" (orange). Also, illustrative clearances 314 may include classifications from "Top Secret" to "Secret" to "Confidential" and finally to "Unclassified" (or "none"). The security settings 310 thus define the sets of security attributes that may be used within the authentication system, and their qualities (e.g., clearance ordering, such that Top Secret clearance includes Secret, Confidential, and Unclassified clearances, etc.).

Returning to FIG. 3, database 300 may also comprise entries for users 320 and their caveats 322 and clearances 324, as well as entries for computers 330 and their caveats 332 and clearances 334. The information within the database 300 may be configured by a system administrator based on externally available knowledge, such as "setting up" a user's profile, configuring a computer's security settings, etc.

Figure 3B:
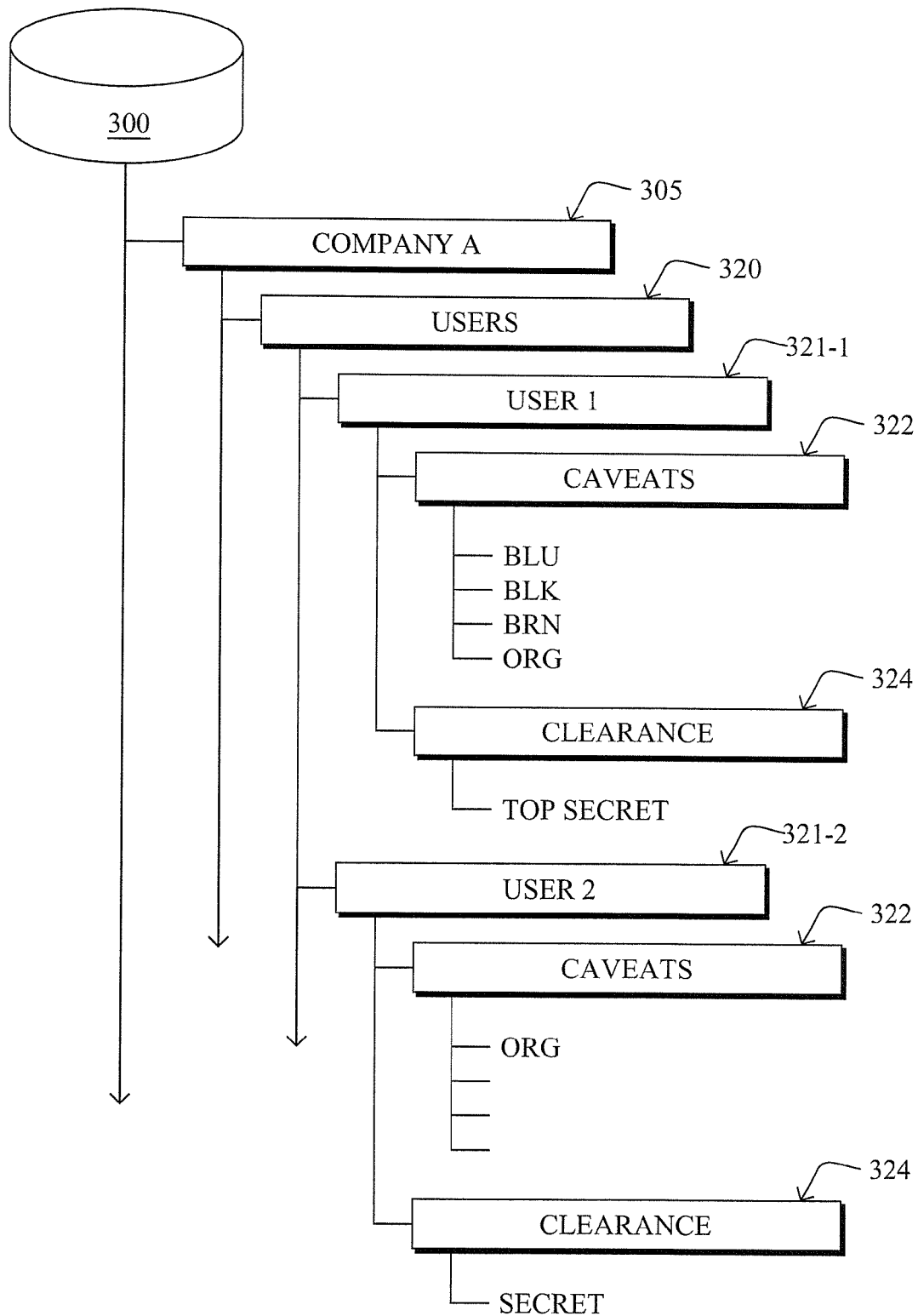

For instance, FIG. 3B illustrates an example portion of the database schema pertaining to the users 320, such as specifically illustrating "User1" (entry 321-1) and "User2" (entry 321-2), along with their associated security information. Specifically, User1's access rights comprise caveats 322 for BLU, BLK, BRN, and ORG along with a clearance level 324 of Top Secret. User2, on the other hand, has caveats 322 for only ORG, and a clearance level 324 of Secret.

It is understood that clearances and caveats are not used to control read versus read\write, create\save or delete; owner; contribute, or read only type access, which are done through separate user provisioning. Clearance and caveats prevent need to know (existence or access).

Figure 3C:
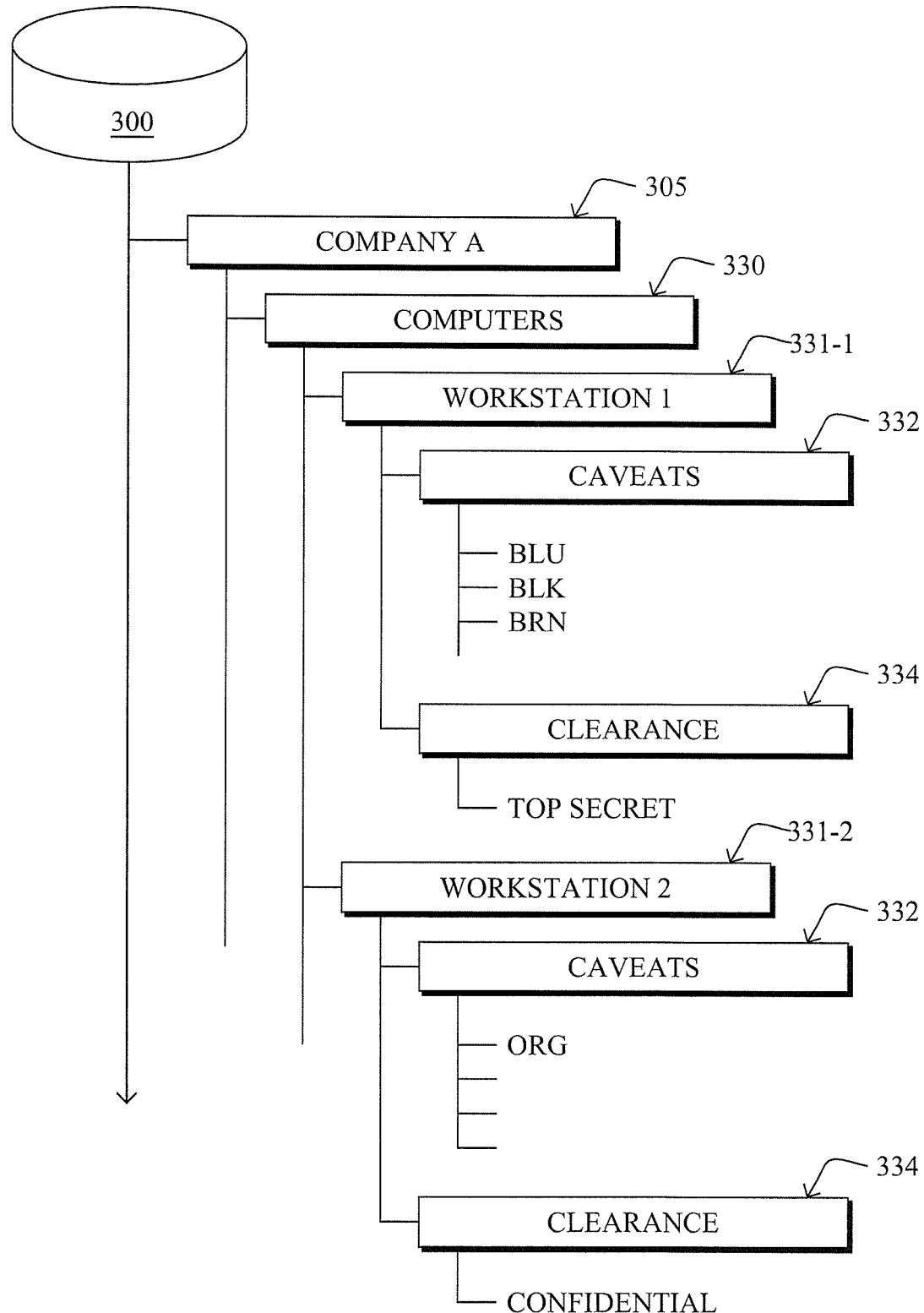

In addition, with reference to FIG. 3C, the computer category 330 may be populated by one or more specific computers, illustratively identified by an identification such as a computer name, an IP address, a media access control (MAC) address, or other uniquely identifying information. Example computers shown include "workstation1" (entry 331-1) and "workstation2" (entry 331-2). Workstation1's access rights as shown include BLU, BLK, and BRN caveats and Top Secret clearance, while workstation2's access rights include the ORG caveat and Confidential clearance.

Figure 4:
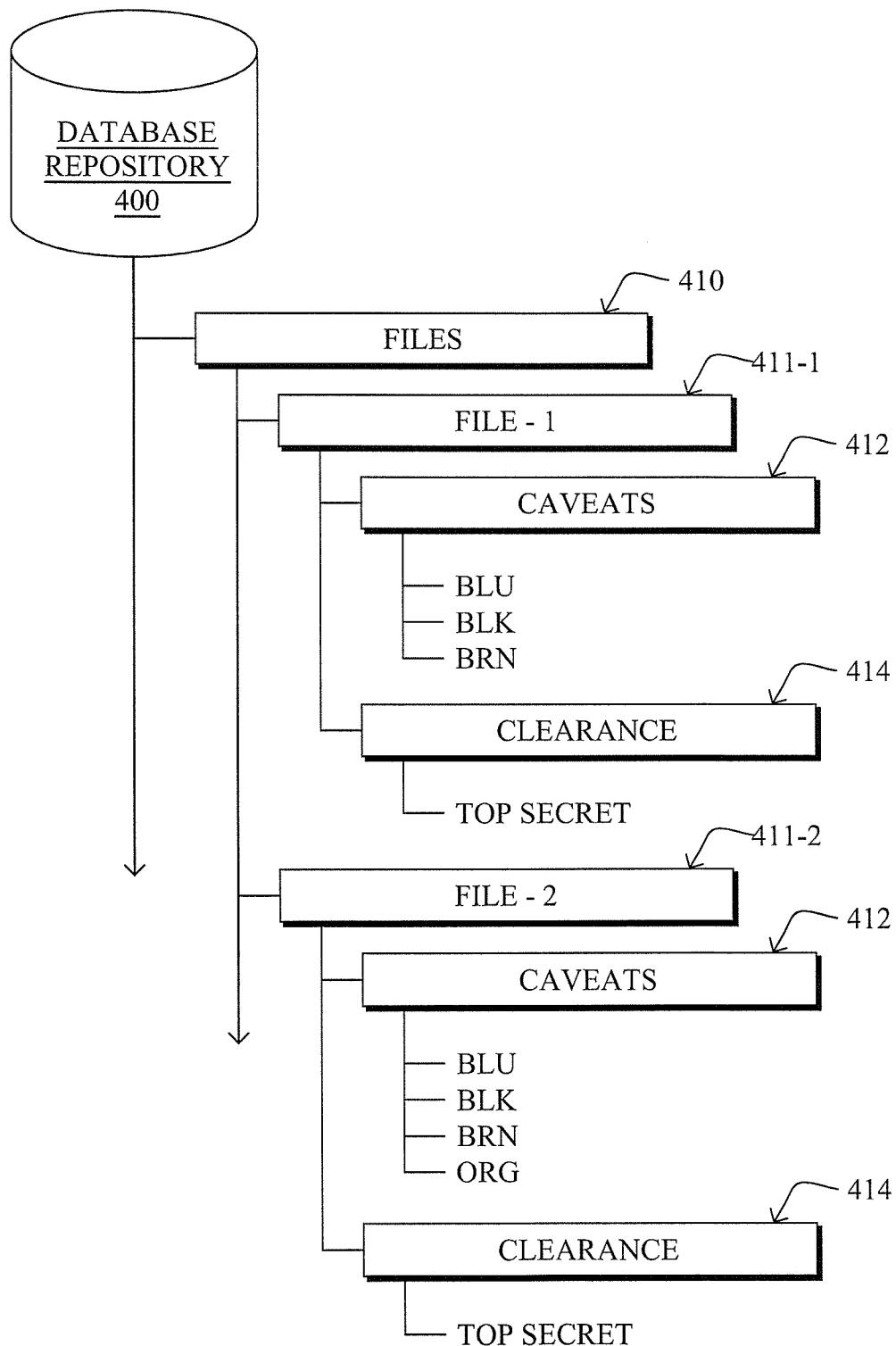
FIG. 4 illustrates an example file repository/database.

According to the one or more embodiments herein, the files are also associated with particular security settings, such as permissions, and are stored in a database 130. FIG. 4 illustrates an example database or repository 400 (one of databases 130), which may be a separate database from database 300, or may be included within the same overall database system. As shown, within the files category 410, one or more files 411 may be stored, along with their associated permissions (e.g., caveats 412 and/or clearances 414). For instance, File-1 (entry 411-1) has permissions associated with BLU, BLK, and BRN caveats 412, and Top Secret clearance 414, while File-2 (entry 411-2) is associated with BLU, BLK, BRN, and ORG caveats 412, and also Top Secret clearance 414. (The use of the permissions is described in detail below.)

Files may be any type of data object, such as documents, emails, web pages, etc., or various types of securable sessions, such as instant messaging (IM) sessions, voice over IP (VoIP) sessions, other collaboration sessions, etc. The actual permissions for the files may be established in a number of manners. For instance, previously created/stored files may have their security permissions manually adjusted (e.g., by an administrator or file creator) at file creation or at a later time, or else the permissions may be established dynamically based on the access rights of the user/computer combination. These permissions may be automatically determined based on the user (e.g., by authentication process 245 on a database server), or else might be entered by the user, e.g., only those permissions to which the user has access.

Figure 4A:
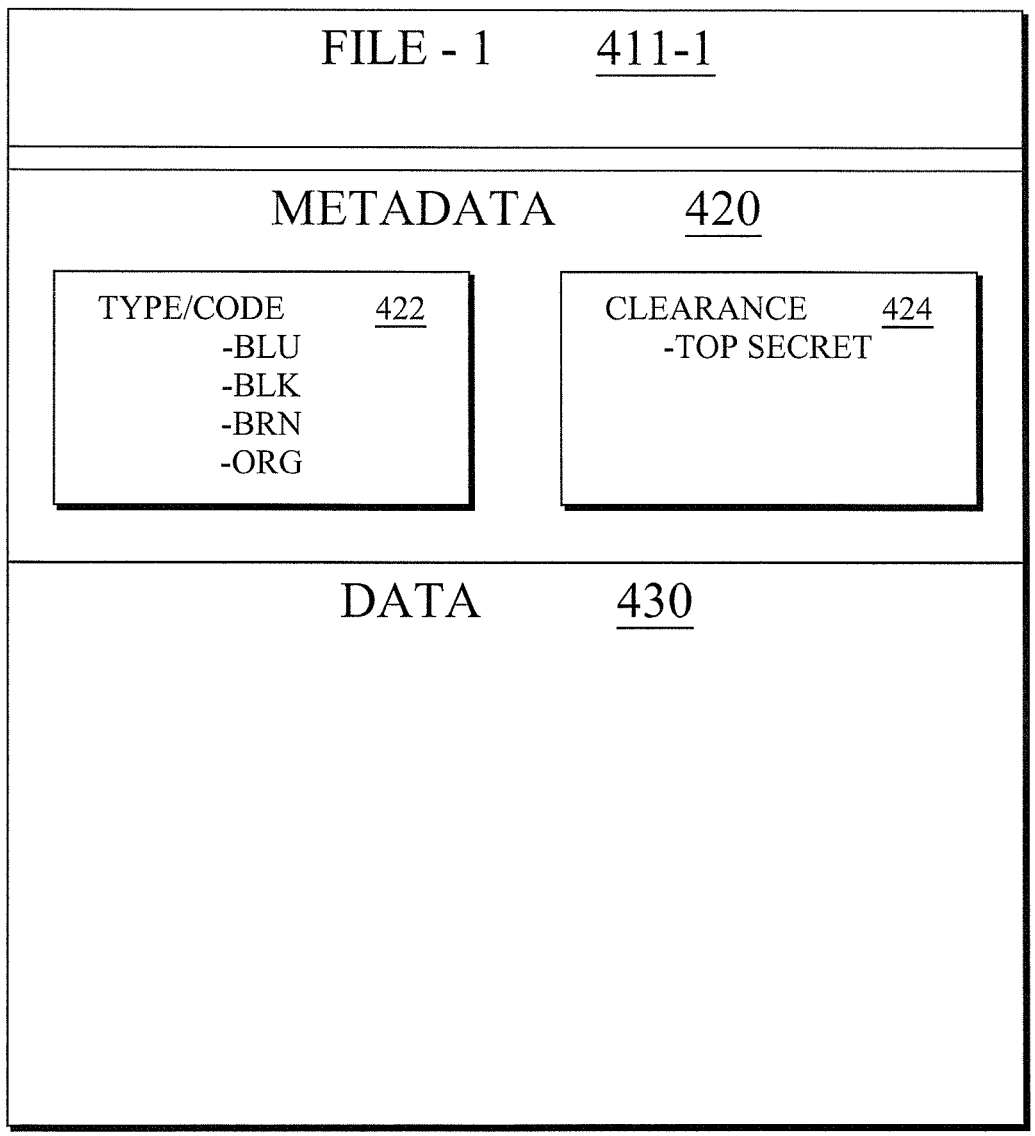
FIG. 4A illustrates an example representation of file permission maintenance.

Note that while the file permissions are shown as a database structure in FIG. 4, in one or more embodiments herein, the permissions are explicitly stored within metadata of the files (e.g., manually entered or, more typically, created by an authentication process 245 on the database server). FIG. 4A illustrates this alternative and/or additional representation of file permission maintenance, where a particular file (e.g., file-1) as stored in the database comprises metadata 420 comprising permissions for that file, e.g., caveats 422 and clearances 424 (corresponding to those shown for file-1 in FIG. 4), and the data 430 for the file itself (e.g., text data, image data, etc.).

Figure 5:
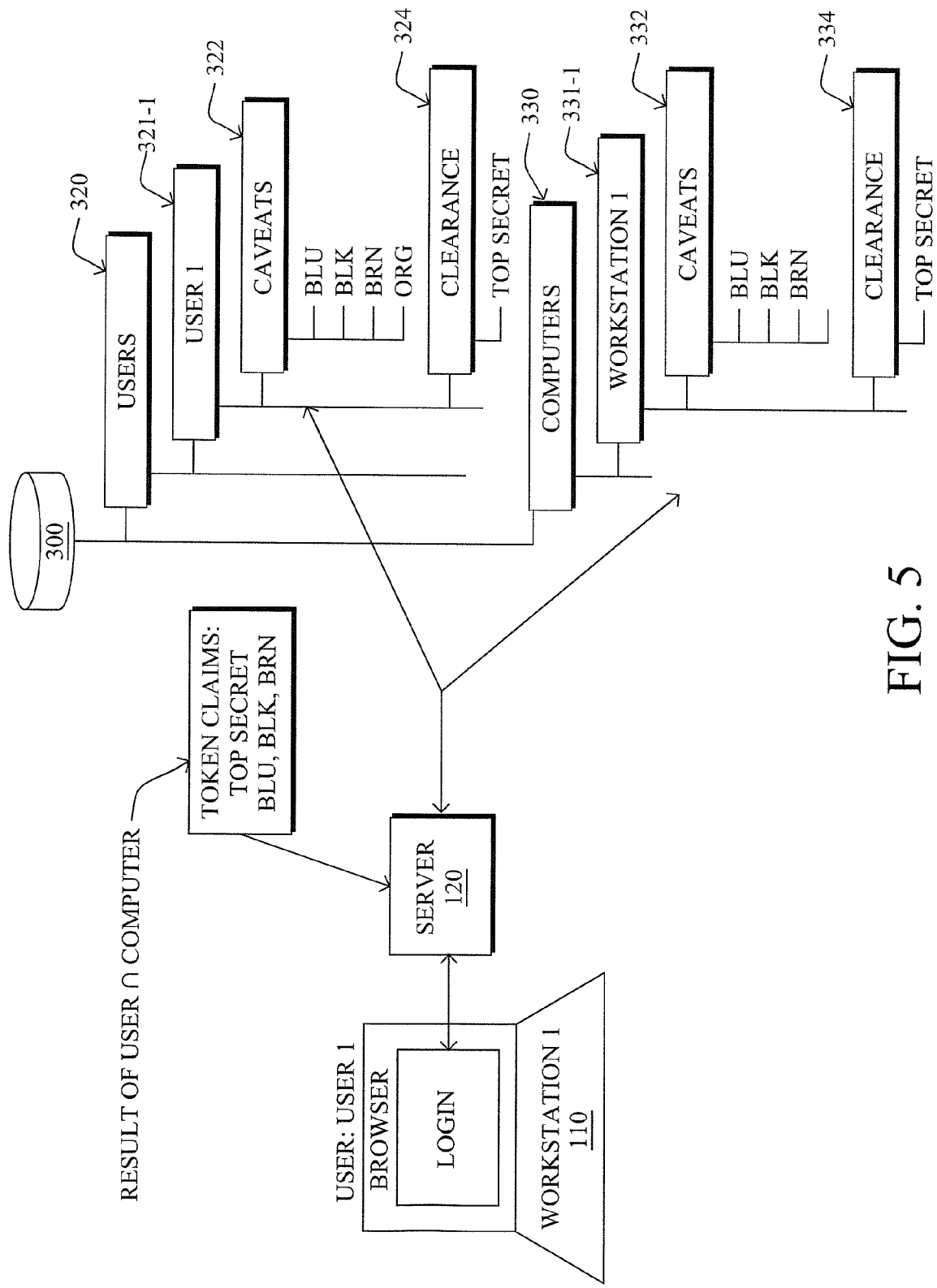
FIG. 5 illustrates an example of session access rights authorization based on a user's access rights and a computer's access rights.

Operationally, as illustrated in FIG. 5, a user (e.g., User1) may initiate a session login request from a computer 110 at a particular location, such as workstation1. This request is received by an appropriate server 120, such as a web server or a specific security server (e.g., after being redirected by a web server). The receiving server then mines the session login request for identification of the user (e.g., a user ID), as well as an identity of the computer itself. As mentioned, this identity may be based on some unique address of the computer used for the session login request. Each of the identifications may then be used by the server 120 to perform a lookup operation into the security database 300 to determine their individual access rights.

Specifically, according to the techniques herein, the server determines user access rights of the user, determines computer access rights of the computer, and from that, determines "session access rights" for the user's session. The session access rights are the result of a user ∩ computer intersection operation, where only the least common solution (overlapping set) of access rights between the user and the computer is allowed for the session. As the example shown, both User1 and Workstation1 have Top Secret clearance. Had they not shared the clearance, the lesser of the two clearances would have been selected for the sessions' clearance level. For the caveats, however, User1 has caveats BLU, BLK, BRN, and ORG, while Workstation1 has only BLU, BLK, and BRN. Accordingly, the result of the user ∩ computer intersection is a Top Secret clearance with only BLU, BLK, and BRN caveats, since the computer (Workstation1) is not approved for accessing files with an ORG caveat.

Note that in certain specific embodiments, the session access rights may be converted into access claims or "tokens", which are relayed back to the computer 110. For instance, while in one or more embodiments the user ∩ computer intersection may be determined by the server for each access or stored for the particular session for which it is the controlling access server (database front end server), in other embodiments the access claims (e.g., tokens) are used by the computer to request authorized access for the session to one or more files in the repository 400. (Note further that the access claims may be used for a different server than the one generating the claims, or for the same server.)

Now that the session access rights have been determined from the user ∩ computer intersection, knowledge of one or more files in the repository may be authorized (or not) based on applying the session access rights to file permissions of the one or more files (e.g., in the database 400 and/or in the metadata 420). Illustrative file permissions include the granting of rights pertaining to whether a session is allowed to view (search for), open, and/or modify only particular authorized files.

Figure 6:
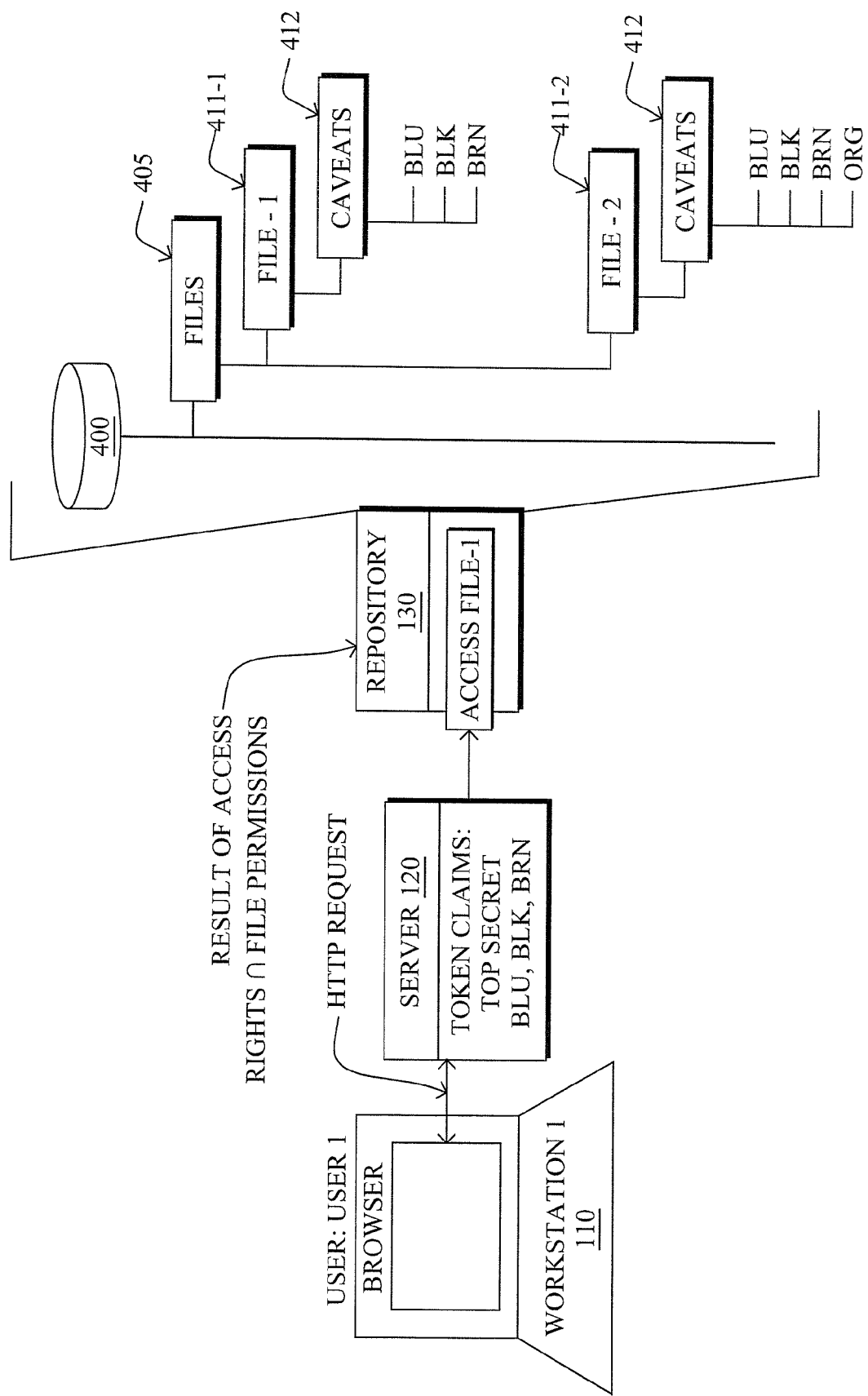
FIG. 6 illustrates an example authorization based on a session's access rights and permissions of one or more files.

FIG. 6 illustrates an example session access for User1 at Workstation1, where the token claims are relayed to a responsible server 120 to access files in repository 130 (e.g., 400). The result of the session access rights ∩ file permissions intersection, or said differently, the user claims ∩ object metadata intersection, is that access (e.g., view, open, modify) is granted to File-1, but not File-2, given that Workstation1, and hence the session, is not associated with the ORG caveat. In other words, seeing the existence of and accessing File-1 would be granted because its metadata is BLU, BLK, BRN, while seeing the existence of and accessing File-2 would not be granted because its metadata is BLU, BLK, BRN, ORG. (Note that the Top Secret clearances have been omitted from FIG. 6 for clarity.)

It should be noted that in accordance with the techniques herein, it is possible to have the session access rights ∩ file permissions intersection based on either logical ANDing or ORing the file permissions, depending upon their desired outcome. For instance, if there is a plurality of file permission requirements for a particular file, then applying the session access rights to file permissions could comprise:
  i) confirming that the session access rights contain each of the plurality of file permission requirements (ANDing);
  ii) confirming that the session access rights contain one or more of the plurality of file permission requirements (ORing); or
  iii) confirming that the session access rights contain at least one particular requirement of the plurality of file permission requirements and one or more other requirements of the plurality of file permission requirements (a combination of ANDing and ORing).

The ANDing and ORing may take place between any of the security attributes, such as between the clearance and the caveats (e.g., a particular clearance AND a particular caveat), and/or between the particular caveats (BLU AND BRN, or BLU OR BRN). The BOOLEAN comparisons may also be nested, such as, e.g., a different clearance AND (a first caveat OR a second caveat). The following files offer examples of how such BOOLEAN file permissions may occur according to one or more embodiments herein:
  File "A": Anyone with Secret clearance and BLU OR BLK caveats may access the file (e.g., BLU and BLK could be mutually exclusive caveats, such as companies collaborating on a project or countries in a military collaboration, etc.);
  File "B": Anyone with Top Secret clearance and BRN AND ORG caveats may access the file (such that someone with Top Secret clearance and BRN but not ORG may not access the file);
  File "C": Anyone with Top Secret clearance AND BLK AND BRN caveats may modify the file (illustrating different levels of access for the same file based on the session access rights);
  File "D": Anyone with Top Secret clearance OR anyone with Secret clearance AND BLK AND BRN caveats may modify the file;
  etc. (Those skilled in the art will understand that any BOOLEAN combination of file permissions may be established, and that those shown herein are merely examples that are not meant to be limiting on the scope of the invention herein.)

It is understood that application of the file permission requirements can be associated with various levels. In one embodiment, application of the plurality of file permission requirements within the file permissions may be defined at the system level. When defined at the system level, one embodiment of the permission application may be applied as an "ORing" operation, where as in another embodiment they might be applied as an "ANDing" operation. In other embodiments, the file permissions may be defined at the at the file level, in either an "ANDing" or "ORing operation. In another embodiment, permissions are applied in a hybrid module with some "ANDing" and some "ORing." In another embodiment, permission application is not at the system or file level, but defined in the elements themselves. This embodiment may have associated logic structure that dictates when to apply as "ANDing" or when to apply as "ORing" given the ability to define complex definitions as to how the file permissions can be applied.

In another embodiment, within a system that provides only "ORing" capabilities, the plurality of the permissions cannot be correctly applied through membership of each plurality. In order to compensate, the unique combinations of the pluralities are represented as singletons. In such an embodiment, a system that supports Top Secret, BLK, BLU, and BRN would include the following singletons: "TS(BLK)", "TS(BLU)", "TS(BRN)", "TS(BLK!BLU)", "TS(BLK!BRN)", TS(BLU-!BRN)", "TS(BLK!BLU!BRN)".

Also in this embodiment, the session permissions are formatted into the set of combinations and the user is placed in each of the singletons as a member. A user's session permissions for Top Secret, BLK, BLU, and RED results in session assignments to each of the following singletons:

"TS(BLK)", "TS(BLU)", "TS(RED)", "TS(BLK!BLU)", "TS(BLK! RED)", TS(BLU!RED)", "TS(BLK!BLU! RED)".

In addition for this embodiment, the file permissions, Top Secret, BLK, and BLU, are formatted into the singleton representation, "TS(BLK!BLU)" and given to the document rather than individual permissions of Top Secret, BLK and BLU. Given the above session permissions the user would be granted access to the document since both are members of the "TS(BLK!BLU)" singleton.

Figure 7:
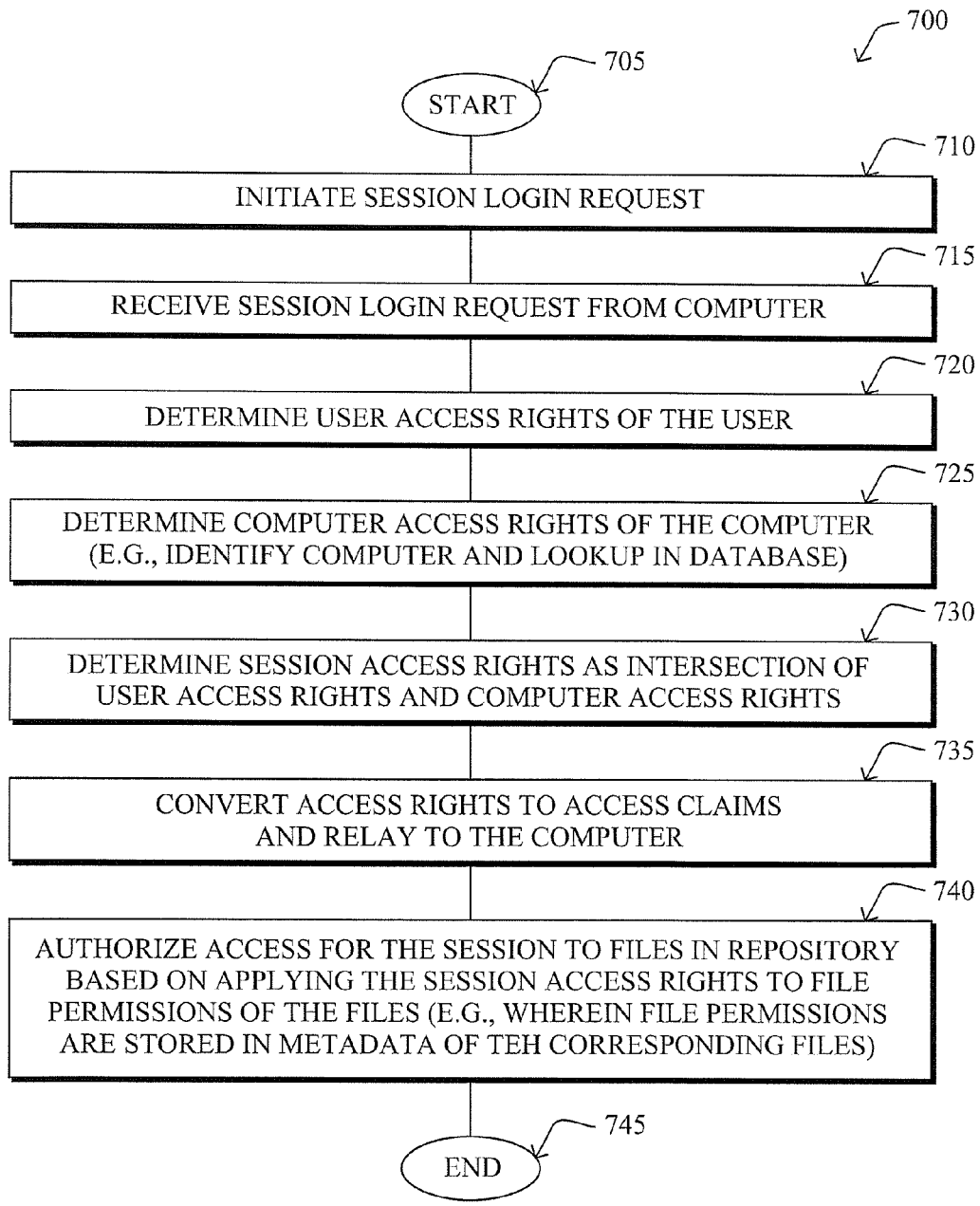
FIG. 7 illustrates an example simplified procedure for providing authorized data access based on the rights of a user and a location.

FIG. 7 illustrates an example simplified procedure for providing authorized data access based on the rights of a user and a location in accordance with one more embodiments herein. The procedure 700 starts at step 705, and continues to step 710, where a user initiates a session login request from a computer 110 (e.g., workstation 1). A server 120, as described above, receives the session login request from the particular computer in step 715. From the login request, and as described in greater detail above, in step 720 the server may determine the user access rights of the user, and in step 725 the server may also determine the computer access rights of the computer, such as by identifying the computer based on its location/address and performing a lookup operation into the database 300.

The session's access rights may then be determined in step 730 as the intersection of the user access rights and the computer access rights, as described above. In one embodiment, in step 735 the session access rights may be converted to access claims (e.g., tokens) and relayed to the logged-in computer. Once the session access rights have been determined, they may be used in step 740 to authorize access for the session to files in a repository 400. In particular, in accordance with one or more embodiments of the invention as described in detail above, access may be authorized based on applying the session access rights to file permissions of the files (e.g., in metadata of the corresponding files or in the repository 400). The procedure 700 ends in step 745, such as once the session is completed, the user is logged off, etc.

The novel techniques described herein, therefore, provide authorized data access based on the rights of a user and a location. In particular, the techniques herein grant access properly regardless of whether a user is at a primary location or roaming to a different location with different access rights. Specifically, the embodiments herein consider the user's rights, the rights of any computer from which the user is logging in, and the permissions (rights) associated with the individual files. Also, in one embodiment, by using security token service (e.g., STS), custom claims may be formulated for the User ∩ Computer intersection, and any application can then use the incoming claims and compare them to any file's metadata to determine access rights. Moreover, the techniques herein prevent visibility of a data object/file by building dynamic views of the files, such that an unauthorized user would be unaware of the existence of a file to which the user ∩ computer intersection is not to be granted access.

In addition, certain conventional security applications allow for "explicit ownership," where when a particular user creates/stores a file that user is given complete access. However, as noted above, this can be problematic when this "explicit owner" attempts to access the file from an unsecure computer. Accordingly, the techniques herein are not solely based on user access rights, but compare rights of the user and the location (the computer) on a per-file permission basis (e.g., based on metadata in the files).

While there have been shown and described illustrative embodiments that provide authorized data access based on the rights of a user and a location, it is to be understood that various other adaptations and modifications may be made within the spirit and scope of the embodiments herein. For example, the embodiments have been shown and described herein with relation to particular security/authorization terminology, such as clearance, caveat, etc. However, the embodiments in their broader sense are not so limited, and may, in fact, be used with other types of access rights, such as priority, groups, etc. Also, while the techniques described above have generally references a security control server, the techniques are equally applicable to any computer system where security access is desired, such as direct peer-to-peer access, etc.

The foregoing description has been directed to specific embodiments. It will be apparent; however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method operable within a computer network, the method comprising:
   receiving, at a server in operable communication with the computer network, a session login request by a user using a computer in operable communication with the computer network;
   determining a set of security settings for the computer network, the set of security settings defining a plurality of security attributes, the security attributes comprising at least one of a security clearance, a security classification, and a security caveat;
   determining, based at least in part on the received login request and on a corresponding unique identification of the user, a set of user access rights of the user applicable during the session, the set of user access rights being individual to the user and comprising security attributes that are unrelated to the role of the user, wherein the set of user access rights comprises one or more security attributes selected from the set of security settings;
   receiving at least one unique identifier associated only with the computer from which the login request was received;
   determining, based the received at least one unique identifier, a corresponding set of computer access rights of the computer that are applicable during the session, the set of computer access rights being individual to the computer and independent of the set of user access rights and comprising one or more security attributes selected from the set of security settings;
   determining, for the session to which the user is attempting login to the computer, the content of a set of session access rights, wherein determining the content of the set of session access rights comprises:
      (a) determining whether the set of user access rights intersects with the set of computer access rights to result in one or more common security attributes;
      (b) defining, if there is an intersection, a set of session access rights comprising the one or more common security attributes; and
      (c) defining, if there is no intersection, the set of session access rights to be an empty set;
   permitting the user to have access to the computer, during the session, in accordance with the content of the set of session access rights, wherein if the set of session access rights is empty, the user is denied permission to access the computer;
   independent of the determination of the content of the set of session access rights, generating, for at least one file accessible via the computer network, a first subset of file permissions required for a first predetermined type of authorized access to the at least one file, wherein the at least one file comprises data for the file itself and file metadata, the file metadata storing therein a set of file permissions selected from the plurality of security attributes;
   if the user has successfully logged into the session on the computer and the set of session rights is defined, and if generation of the first subset of file permissions is complete, then before any information about the file or its existence is made available to the user, first apply the session rights to the first subset of file permission to determine whether a set of file access rights exists and includes any respective members, the respective members in the set of file access rights comprising a first predetermined subset of security attributes common to both the session access rights and the first subset of file permissions;
   if the set of file access rights contains no members, generating information usable to prevent the user from access to or having knowledge of the existence of the file; and
   if the set of file access rights includes one or more members, then generating information usable to authorize the user, during the session, to have at least one of knowledge of the file and access to the file in accordance with the security attributes corresponding to the one or more members of the set of file access rights.

2. The method as in claim 1, wherein the first predetermined subset of security attributes corresponds to a condition wherein the set of session access rights contains each of the first subset of file permissions.

3. The method as in claim 1, wherein the first predetermined subset of security attributes corresponds to a condition wherein the set of session access rights contains one or more of the first subset of file permissions.

4. The method as in claim 1, wherein the first predetermined subset of security attributes corresponds to a condition wherein the set of session access rights contain at least one particular file permission from the first subset of file permissions and one or more other file permissions from the first subset of file permissions.

5. The method as in claim 1, wherein determining the set of computer access rights of the computer comprises:
   uniquely identifying the computer used for session login based on at least one unique identifier selected from the group comprising computer name, IP address, MAC address, unique network address, and a public key infrastructure (PKI) PKI signature of the computer; and
   performing, based on the unique identification of the computer, a lookup operation into a database to determine the corresponding set of computer access rights of the computer, the database being in operable communication with the server.

6. The method according to claim 5, wherein determining the set of user access rights further comprises uniquely identifying the user based at least in part upon a user session, biometric information associated with the user, and a user PKI signature.

7. The method as in claim 1, further comprising:
   determining a set of custom access claims based on the set of session access rights; and
   generating information usable to relay the set of custom access claims to the computer, wherein the set of custom access claims are usable by the computer to request access to the file in accordance with the set of file access rights.

8. The method as in claim 1, wherein the set of user access rights, the set of computer access rights, the set of session access rights, the first subset set of file permissions, and the set of file access rights each comprise at least one of a security classification, a security clearance, and a security caveat.

9. The method as in claim 1, wherein the first subset of file permissions are determined, at the server, to be configured at a system level, a file level, and/or in a logic structure.

10. The method as in claim 1, wherein at least one file permission in the first subset of file permissions is represented as a singleton, the singleton corresponding to a unique combination of two or more file permissions from the set of file permissions.

11. The method of claim 1, further comprising:
   receiving, if permitted in accordance with the set of file access rights, a request from the user to change at least a portion of a set of file permissions associated with the file;

generating information usable to change the at least a portion of the set of file permissions in accordance with the request to change; and generating information usable to dynamically adjust a session-specific dynamic view of the file in accordance with the at least a portion of the set of file permissions that was changed.

12. A tangible, non-transitory computer-readable medium having software encoded thereon, the software, when executed by a processor coupled to a computer network that is in operable communication with at least one file, operable to:

determine a set of security settings for the computer network, the set of security settings defining a plurality of security attributes, the security attributes comprising at least one of a security clearance, a security classification, and a security caveat;

receive a session login request by a user from a computer;

determine, based at least in part on the received login request and on a corresponding unique identification of the user, a set of individual user access rights of the user applicable during the session, the set of user access rights being individual to the user and comprising security attributes that are unrelated to the role of the user, wherein the set of user access rights comprises one or more security attributes selected from the set of security settings;

receive at least one unique identifier associated only with the computer from which the login request was received;

determine, based on the received at least one unique identifier, a corresponding set of computer access rights of the computer that are applicable during the session, the set of computer access rights being individual to the computer and independent of the set of user access rights and comprising one or more security attributes selected from the set of security settings;

determine, for the session to which the user is attempting login to the computer, the content of a set of session access rights, wherein determining the content of the set of session access rights comprises:
  (a) determining whether the set of user access rights intersects with the set of computer access rights to result in one or more common security attributes;
  (b) defining, if there is an intersection, a set of session access rights comprising the one or more common security attributes; and
  (c) defining, if there is no intersection, the set of session access rights to be an empty set;

permit the user to have access to the computer, during the session, in accordance with the content of the set of session access rights, wherein if the set of session access rights is empty, the user is denied permission to access the computer;

generate, independently to the determination of the content of the set of session access rights, for at least one file accessible via the computer network, a first subset of file permissions required for a first predetermined type of authorized access to the at least one file, wherein the at least one file comprises data for the file itself and file metadata, the file metadata storing therein a set of file permissions selected from the plurality of security attributes;

apply, if the user has successfully logged into the session on the computer, and if generation of the first subset of file permissions is complete, before any information about the file or its existence is made available to the user, the session rights to the first subset of file permission to determine whether a set of file access rights exists and includes any respective members, the respective members in the set of file access rights comprising a first predetermined subset of security attributes common to both the session access rights and the first subset of file permissions;

generate, if the set of file access rights contains no members, information usable to prevent the user from access to or having knowledge of the existence of the file; and generate, if the set of file access rights includes one or more members, information usable to authorize the user, during the session, to have at least one of knowledge of the file and access to the file in accordance with the security attributes corresponding to the one or more members of the set of file access rights.

13. The computer-readable medium as in claim 12, wherein the first predetermined subset of security attributes corresponds to a condition wherein the set of session access rights contains each of the first subset of file permissions.

14. The computer-readable medium as in claim 12, wherein the first predetermined subset of security attributes corresponds to a condition wherein the set of session access rights contains one or more of the first subset of file permission requirements.

15. The computer-readable medium as in claim 12, wherein the first predetermined subset of security attributes corresponds to a condition wherein the set of session access rights contain at least one particular file permission from the first subset and one or more other file permissions from the first subset of file permissions.

16. The computer-readable medium as in claim 12, wherein the software when executed is further operable to:

determine a set of custom access claims based on the set of session access rights; and generate information usable to relay the set of custom access claims to the computer, wherein the set of custom access claims are usable by the computer to request access to the file in accordance with the set of file access rights.

17. The computer-readable medium of claim 12, wherein the software is further operable to:

receive, if permitted in accordance with the set of file access rights, a request from the user to change at least a portion of a set of file permissions associated with the file;

generate information usable to change the at least a portion of the set of file permissions in accordance with the request to change; and generate information usable to dynamically adjust a session-specific dynamic view of the file in accordance with the at least a portion of the set of file permissions that was changed.

18. An apparatus, comprising:

one or more network interfaces, at least one of the network interfaces being in operable communication with at least one file;

a processor coupled to the network interfaces and adapted to execute one or more processes; and a memory configured to store a process executable by the processor, the process when executed operable to:

determine a set of security settings applicable to the process, the set of security settings defining a plurality of security attributes, the security attributes comprising at least one of a security clearance, a security classification, and a security caveat;

receive a session login request by a user from a computer;

determine, based at least in part on the received login request and on a corresponding unique identification of the user, a set of user access rights of the user applicable during the session, the set of user access rights being individual to the user and comprising security attributes that are unrelated to the role of the user, wherein the set of user access rights comprises one or more security attributes selected from the set of security settings;

receive at least one unique identifier associated only with the computer from which the login request was received;

determine, based on the received at least one unique identifier, a corresponding set of computer access rights of the computer that are applicable during the session, the set of computer access rights being individual to the computer and independent of the set of user access rights and comprising one or more security attributes selected from the set of security settings;

determine, for the session to which the user is attempting login to the computer, the content of a set of session access rights, wherein determining the content of the set of session access rights comprises:
  (a) determining whether the set of user access rights intersects with the set of computer access rights to result in one or more common security attributes;
  (b) defining, if there is an intersection, a set of session access rights comprising the one or more common security attributes; and
  (c) defining, if there is no intersection, the set of session access rights to be an empty set;

permit the user to have access to the computer, during the session, in accordance with the content of the set of session access rights, wherein if the set of session access rights is empty, the user is denied permission to access the computer;

generate, independently to the determination of the content of the set of session access rights, for at least one file accessible via the computer network, a first subset of file permissions required for a first predetermined type of authorized access to the at least one file, the at least one file comprising data for the file itself and file metadata, the file metadata storing therein a set of file permissions selected from the plurality of security attributes apply, if the user has successfully logged into the session on the computer, and if generation of the first subset of file permissions is complete, before any information about the file or its existence is made available to the user, the session rights to the first subset of file permission to determine whether a set of file access rights exists and includes any respective members, the respective members in the set of file access rights comprising a first predetermined subset of security attributes common to both the session access rights and the first subset of file permissions;

generate, if the set of file access rights contains no members, information usable to prevent the user from access to or having knowledge of the existence of the file; and generate, if the set of file access rights includes one or more members, information usable to authorize the user, during the session, to have at least one of knowledge of the file and access to the file in accordance with the security attributes corresponding to the one or more members of the set of file access rights.

19. The apparatus of claim 18, wherein the process is further operable to:

receive, if permitted in accordance with the set of file access rights, a request from the user to change at least a portion of a set of file permissions associated with the file;

generate information usable to change the at least a portion of the set of file permissions in accordance with the request to change;

generate information usable to dynamically adjust a session-specific dynamic view of the file in accordance with the at least a portion of the set of file permissions that was changed.

* * * * *